US008719137B2

(12) United States Patent
Allen

(10) Patent No.: US 8,719,137 B2
(45) Date of Patent: May 6, 2014

(54) ARRANGEMENT FOR AND A METHOD OF DETERMINING DAMAGES IN SHAREHOLDER CLASS ACTION LITIGATION

(76) Inventor: Linda Allen, Oceanside, NY (US)

( * ) Notice: Subject to any disclaimer, the term of this patent is extended or adjusted under 35 U.S.C. 154(b) by 621 days.

(21) Appl. No.: 11/811,408

(22) Filed: Jun. 8, 2007

(65) Prior Publication Data
US 2007/0299788 A1    Dec. 27, 2007

Related U.S. Application Data

(60) Provisional application No. 60/815,356, filed on Jun. 21, 2006.

(51) Int. Cl.
*G06Q 10/06* (2012.01)
*G06Q 40/06* (2012.01)

(52) U.S. Cl.
CPC ..................................... *G06Q 40/06* (2013.01)
USPC ......................................... 705/36 R; 705/35

(58) Field of Classification Search
USPC ....................................................... 705/36 R
See application file for complete search history.

(56) References Cited

U.S. PATENT DOCUMENTS 7,146,333 B2 * 12/2006 Hamer et al. ............... 705/36 R

OTHER PUBLICATIONS

Finnerty, J. and G. Pushner, "An Improved Two-Trader Model for Measuring Damages in Securities Fraud Class Actions," 8 Stanford Journal of Law, Business and Finance, Spring 2003, pp. 213-263; 8 Stan. J.L. Bus. & Fin. 213.*
Barclay, M. and F. C. Torchio, "A Comparison of Trading Models Used for Calculating Aggregate Damages in Securities Litigation," Law and Contemporary Problems, vol. 64, Nos. 2&3, Spring/Summer 2001, pp. 105-135.*
Mayer, M.K. "Best Fit Estimation of Damaged Volume in Shareholder Class Actions: The Multi-Sector, Multi-Trader Model of Investor Behavior," NERA Consulting, Oct. 2000.*
Securities Litigation & Regulation, Andrews Litigation Report; vol. 15 h Issue 2 h Jun. 2, 2009 (http://web.omm.com/files/upload/When%20Plaintiffs%20Overreach.pdf).*
Bassin, W.M., "A Two Trader Population Share Retention Model for Estimating Damages in Shareholder Class Action Litigations," 6 *Stanford Journal of Law, Business and Finance*, 49, 2000.
W.H. Beaver and J.K. Malernee, "Estimating Damages in Securities Fraud Cases," Cornerstone Research, 1990.
W.H. Beaver, J.K. Malernee, and Keeley, "Potential Damages Facing Auditors in Securities Fraud Cases," in *Accountants' Liability: The Need for Fairness* 113 (John T.Behrendt t al., eds., 1994).
Brennan, M.J. and A. Subrahmanyam, "Investment Analysis and Price Formation in Securities Markets," *Journal of Financial Economics*, vol. 38, 1995, pp. 361-381.

(Continued)

*Primary Examiner* — Narayanswamy Subramanian
*Assistant Examiner* — Asha Puttaiah
(74) *Attorney, Agent, or Firm* — Kirschstein, et al.

(57) ABSTRACT

Current practice in class action litigation entails a series of arbitrary assumptions about fundamental parameters that may not meet Daubert standards of scientific evidence. A new theoretically-grounded microstructure trading model (TMTM) method and arrangement determines retained shares for use in damages calculations for securities fraud cases and complies with Daubert standards. In particular, the TMTM method classifies trades as "buys" or "sells", as well as estimates trading intensity using the bid-ask spread. The TMTM method has been found to yield more accurate estimates of retained shares than heretofore.

9 Claims, 8 Drawing Sheets

(56) References Cited

OTHER PUBLICATIONS

Chakravarty, S. and J.J. McConnell, "Does Insider Trading Really Move Stock Prices?" *Journal of Financial and Quantitative Analysis*, vol. 34, 1999, pp. 191-209.

Cohen, K.J., S.F. Maier, R.A. Schwartz, D.K. Whitcomb, "Market Makers and the Market Spread: A Review of Recent Literature," *Journal of Financial and Quantitative Analysis*, Nov. 1979, pp. 813-835.

Cone, K.R., and J.E. Laurence, "How Accurate are Aggregate Damages in Securities Fraud Cases?" 49 *Business Law* 505, 1994.

Easley, D., N. M. Kiefer, and M. O'Hara, "Cream-Skimming or Profit-Sharing? The Curious Role of Purchased Order Flow," *Journal of Finance*, vol. 51, 1996, pp. 1405-1436.

Ellis, K., R. Michaely, M. O'Hara, "The Accuracy of Trade Classification Rules: Evidence from Nasdaq," *Journal of Financial and Quantitative Analysis*, vol. 35, No. 4, Dec. 2000, pp. 529-551.

Finnerty, J. and G. Pushner, "An Improved Two-Trader Model for Measuring Damages in Securities Fraud Class Actions," 8 *Stanford Journal of Law, Business and Finance*, Spring 2003, pp. 1-53.

Finucane, T.J., "A Direct Test of Methods for Inferring Trade Direction from Intra-Day Data," *Journal of Financial and Quantitative Analysis*, vol. 35, No. 4, Dec. 2000, pp. 553-376.

Furbush, D and J.W. Smith, "Estimating the Number of Damaged Shares in Securities Fraud Litigation: An Introduction to Stock Trading Models," *The Business Lawyer, 49 Business Law 527*, Feb. 1994, pp. 2-16.

Garbade, K.D., "The Effect of Interdealer Brokerage on the Transactional Characteristic of Dealer Markets," *Journal of Business*, vol. 51, No. 3, Jul. 1978, pp. 477-498.

Harris, J.H. and P.H. Schultz, "The Importance of Firm Quotes and Rapid Executions: Evidence from the January 1994 SOES Rules Change," *Journal of Financial Economics*, vol. 45, 1997, pp. 135-166.

Hasbrouck, J., "Trades, Quotes, Inventories and Information," *Journal of Financial Economics*, vol. 22, 1988, pp. 229-252.

Houlthausen, R.W., R.W. Leftwich and D. Mayers, "The Effect of Large Block Transactions on Security Prices: A Cross-Sectional Analysis," *Journal of Financial Economics*, vol. 19, 1987, pp. 237-267.

Kumar, R., A. Sarin, and K. Shastri, "The Impact of Options Trading on the Market Quality of the Underlying Security: An Empirical Analysis," *Journal of Finance*, vol. 53, 1998, pp. 717-732.

Lee, C.M. and M.J. Ready, "Inferring Trade Direction from Intraday Data," *Journal of Finance*, vol. 46, No. 2, Jun. 1991, pp. 733-746.

Madhavan, A. and M. Cheng, "In Search of Liquidity: Block Trades in the Upstairs and Downstairs Markets," Review of Financial Studies, vol. 10, 1997, pp. 175-203.

Stephen P. Younger, "Damages in Securities Litigation," Feb. 11, 2004, S&P's The Review of Securities Commodities Regulation.

Daily TAQ, (hirtorical Trades 7 Quotes), http://www.nyxdata.com/Data-Products/Daily-TAQ, pp. 1-3.

\* cited by examiner

STEP 1: CALCULATE MAXIMUM HOLDING PERIOD SHARE TURNOVER (DENOTED $N$)

Calculate the average daily volume of shares transacted during the Class Period =

$$\sum_{t=0}^{T} V_t = \overline{V}$$

Calculate the maximum holding period share turnover $N$:

$$N = \frac{S - FI - I}{\overline{V} - D}$$

FIG. 1

STEP 2: BREAK DAILY TRANSACTION VOLUME INTO SALES AND
PURCHASES USING ELLIS, MICHAELY AND O'HARA (2000) QUOTE/TICK
RULE FOR STOCKS TRADED ON NASDAQ

For each date $t$ from $N$ days prior to the start of the Class Period until the last date of the
Class Period, calculate the daily sales and daily purchases using directional trading
models, e.g., Ellis, Michaely and O'Hara (2000).

ALTERNATIVE STEP 2': BREAK DAILY TRANSACTION VOLUME INTO SALES AND PURCHASES USING LEE AND READY (1991) QUOTE/TICK RULE FOR STOCKS TRADED ON NYSE

For each date $t$ from $N$ days prior to the start of the Class Period until the last date of the Class Period, calculate the daily sales and daily purchases using directional trading models (e.g., Lee and Ready (1991)).

STEP 3: CALCULATE THE DAILY AVERAGE SALES PROPENSITY AS A FUNCTION OF THE DAILY BID-ASK SPREAD ON THE DATE OF PURCHASE

ALTERNATIVE STEP 3': CALCULATE THE DAILY AVERAGE SALES PROPENSITY AS A FUNCTION OF THE DAILY BID-ASK SPREAD ON THE DATE OF PURCHASE

STEP 4: CALCULATE THE RETAINED SHARES OVER THE CLASS PERIOD

ARRANGEMENT FOR AND A METHOD OF DETERMINING DAMAGES IN SHAREHOLDER CLASS ACTION LITIGATION

CROSS REFERENCE TO RELATED APPLICATION

This application claims priority to U.S. provisional application Ser. No. 60/815,356, filed Jun. 21, 2006.

DESCRIPTION OF THE RELATED ART

Financial markets function effectively only if they are fed a steady diet consisting of full and accurate information disclosure. Recent scandals regarding failure to disclose material information, or the misleading and deceptive disclosures of information, have led to a proliferation of fraud-on-the-market litigation. Damages assessed in these cases act as the economic penalties that, ex ante, inhibit behavior that undermines the integrity of global financial markets. In order to act as an effective deterrent on bad behavior, damages must be properly determined.

There are two inputs required to accurately determine damages in fraud-on-the-market cases. The first is an estimate of the price inflation that was caused by the fraudulent disclosures. It is possible that the fraud on the market may cause share prices to decline, but most cases deal with loss causation resulting from the unwarranted inflation in share prices. For concreteness, only the case of prices that were inflated by the fraudulent behavior is discussed herein. The second is an estimate of the number of damaged shares. The measure of damages is then determined by multiplying the price inflation per share times the number of damaged shares.

However, this is easier said than done. Whereas an event study based on a theoretical market method can be used to estimate the extent of the share price inflation using daily share prices and the public record of relevant events, there is no such theoretical basis currently used to calculate the number of damaged shares. Moreover, detailed shareholding and transaction data are not available to implement a purely empirical approach to an estimation of the number of damaged shares. Current approaches rely on arbitrary assumptions that invariably result in dueling experts, because they cannot be validated by either theory or empirical investigation.

The problem of accurately determining damages is complicated by the fact that damage estimates may precede discovery and, therefore, must be performed using publicly available data. However, even if damages are calculated with the benefit of the discovery process, it is virtually impossible to obtain on discovery the detailed transaction data required to exactly count the number of damaged shares. This is because damages do not apply to any shares that are bought before and subsequently sold after the class period (Class Period), i.e., the time frame during which the alleged fraud or other securities law violations artificially inflated the price of the shares at issue, or to any shares that are both bought and sold within the Class Period (the "in-and-out shares"). Indeed, it is the number of shares that were bought at some date during the Class Period and only sold after the end of the Class Period that must be accurately determined, thereby focusing on only those damaged shares that were bought at inflated prices during the Class Period and only sold after the share price declined upon revelation of the fraud. Trading methods have been employed to eliminate the in-and-out shares so as to arrive at an estimate of the number of damaged shares to be used in the damage determination.

For a trading method to be useful, it must be tractable, i.e., can be estimated using readily publicly available data; it must not be perceived as arbitrary with respect to critical parameter values and assumptions; and it must be based on generally accepted financial theory and validated using empirical data. Unfortunately, each of the currently known prior art methods used in practice lacks one or more of these fundamental attributes. Furthermore, the U.S. Supreme Court in *Daubert v. Merrell Dow Pharmaceuticals, Inc.*, 509 U.S. 579 (1993) reiterated a four-part test for scientific evidence that had been described in *Kumho Tire Co. v. Carmichael*, 526 U.S. 137 (1999). The so-called Daubert standard states that to be admissible, the courts must ascertain that the theory or technique has been appropriately tested and found valid; the technique or theory has been subjected to peer review and published in a respected journal or other suitable outlet; the error rate is low enough so that the theory or technique is reliable; and the theory or technique is "generally accepted" within the expert's profession.

The most commonly used known method of determining the number of retained, i.e., damaged, shares for the purpose of determining damages in litigation involving U.S. Securities and Exchange Commission Rule 10b-5, which rule prohibits any act or omission resulting in fraud or deceit in connection with the purchase or sale of any security, including insider trading, is a proportional trading model (PTM) that assumes that all traders (with the exception of institutions and market makers) have the same propensity to trade. That is, the daily ratio of "adjusted volume" to "float" is determined and used as an estimate of the factor by which the number of retained shares declines on each date during the Class Period. See, for example, Furbush and Smith (1994). Adjusted volume is calculated as the daily trading volume less dealer and specialist transactions. The float is calculated as the number of shares outstanding minus institutional and insider holdings that either do not trade or are ineligible for damages. The ratio of the adjusted volume to the float is used as an estimate of the probability that shares purchased during the Class Period are subsequently sold within the Class Period, thereby rendering them ineligible for damages. This assumes that all traders have an equal propensity to trade (the single trader method) and that all shares have the same probability of trading on any date within the Class Period.

However, the restrictive and unrealistic assumptions of the PTM method, have been criticized by experts and courts alike. For example, the court in *Kaufman v. Motorola, Inc.*, No. 95-C1069, 2000 WL 1506892 at 2 (N.D. Ill. Sep. 21, 2000) stated that the "proportional trading model has never been tested against reality . . . [and] has never been accepted by professional economists" . . . finding it to be a "theory developed more for securities litigation than anything else." Finnerty and Pushner (2003) survey the literature and cite the many articles that refute the PTM method. See, for example, Beaver and Malernee (1990); Beaver, Malernee and Kealey (1993); Cone and Laurence (1994); and Mayer (2000), Bassin (2000).

The single, homogenous trader assumption of the PTM method, while having the benefit of tractability, is clearly arbitrary. In an effort to inject more flexibility into the basic PTM method, an accelerated trading model (ATM) has been proposed, and this method assumes a trade propensity for the single representative trader that is either proportional or accelerated based on the date of share purchase. That is, accelerated variants of the PTM method assess a greater (or lesser) probability of sale for shares more recently purchased.

However, the acceleration (or deceleration) factors are arbitrary. They are not calibrated to the data, because data, by and large, do not exist. They are not grounded in theory, because there is no extant theoretical foundation for the PTM and the ATM methods.

Also known is a two trader model (TTM) which does not fare much better. Rather than assuming a single, homogenous trader, the TTM method arbitrarily posits the existence of two types of traders with different trading intensities: investors (who basically buy and hold the shares) and traders (who have a higher propensity to trade than do investors). In contrast to the ATM method, in which the proportion of high and low intensity traders changes each day, the TTM method assumes that there is a fixed distribution of traders and investors that does not change over time. Actually, the ATM method asymptotically converges to the TTM method over time, as the proportion of high and low intensity traders stabilizes. See Finnerty and Pushner (2003).

While sacrificing some tractability, the TTM method appears to be more "realistic," but there is no way of verifying that since there is often no database available to calibrate the TTM method's assumptions. Trading propensities for each type of trader are assumed and differences of opinions cannot be resolved objectively, because there is no theoretical underpinning to the TTM method. That is, the TTM method assumes either a fixed trading propensity for investors, or for traders. For example, Bassin (2000) assumes a fixed propensity for traders (e.g., traders are more than twenty times more likely to trade than investors), whereas Finnerty and Pushner (2003) assume a fixed trading intensity for investors (such that 0.2 percent of the shares held by investors trade on any given date). There is no theoretical basis for either of these assumptions. This is often motivated by appealing to general market characteristics, but not related to the microstructure of the particular share's trading patterns. For example, Cone and Laurence (1994) use claims data to assert that the TTM method outperforms the PTM method or the ATM method. However, Barclay and Torchio (2001) find that the claims data are unreliable and find that the PTM method, if properly estimated, can yield virtually the same results as a more sophisticated four-trader method. Moreover, the well established academic literature on market microstructure suggests that trading propensity is not constant, but instead is a function of market conditions, such as the bid-ask spread, information flows, liquidity needs, etc. See, for example, Cohen, Maier, Schwartz and Whitcomb (1979) for an early survey of the literature.

SUMMARY OF THE INVENTION

One feature of this invention, briefly stated, resides in an arrangement for, and a method of, more accurately determining damages in shareholder class action litigation by offering a theoretically-grounded microstructure trading model (TMTM) that satisfies the Daubert standard and is parameterized using publicly available data.

In essence, two parameters of the TMTM method are estimated. First, directional trading methods, such as the modified quote rule and the tick rule (see, for example, Lee and Ready (1991); Finucane (2000); and Ellis, Michaely and O'Hara (2000)) are used to distinguish between buys and sells. Whereas the known PTM, ATM and TTM methods all use aggregate trade volume as the basis of their calculations, the new TMTM method utilizes a categorization of daily share volume into the number of shares bought and sold by retail customers.

The direction of a trade can be determined by comparing the transaction price to the quoted "bid-ask spread", i.e., the difference between the "ask" quote and the "bid" quote, and the price of the preceding trade. If the trade is executed at the ask quote, then it is categorized as a purchase by a retail customer from a market maker or broker. If the trade is executed at the bid quote, then it is categorized as a sale by the public to a dealer. Moreover, since market makers cannot sell (buy) on a downtick (uptick), then trades are classified as sells (buys) if the last price was lower (higher) than the transaction price. An uptick occurs if the last transaction price was less than or equal to the transaction price. A downtick occurs if the last transaction price was greater than or equal to the transaction price. That is, if the transaction price reflects an uptick (an increase over the last transaction price), then the trade must have been initiated by a retail buyer. Thus, a "buy" ("sell") occurs if the retail trader initiates a purchase from (sale to) a market maker or specialist. Similarly, if the transaction price reflects a downtick (a decrease compared to the last transaction price), then the trade must have been initiated by a retail seller.

Using a readily publicly available database, such as the trade and quote (TAQ) database, which is a collection of intraday trades and quotes for all securities listed on the New York Stock Exchange (NYSE), American Stock Exchange (Amex), Nasdaq National Market System (Nasdaq) and SmallCap issues, each day's total trading volume can be divided into the total number of sales and the total number of purchases. The modified quote/tick rule classification of buys and sells satisfies the Daubert standards of reliability. Ellis, Michaely and O'Hara (2000) show that the Ellis, Michaely and O'Hara (2000) and the Lee and Ready (1991) algorithms correctly classify more than 75% of the trades. This is particularly true for shares that trade on the NYSE. For Nasdaq shares, that may trade within the bid-ask spread, Ellis, Michaely and O'Hara (2000) proposed an algorithm to improve the trade classification accuracy, above 90% for some subsamples.

Thus, directional trading methods classifying trade direction have a long, well-established history, dating back to Holthausen, Leftwich and Mayers (1987) and Hasbrouck (1988), and are generally accepted by academics, practitioners and regulators. The Ellis, Michaely and O'Hara (2000) and the Lee and Ready (1991) quote/tick methods are incorporated herein by reference thereto. Other methods that are generally accepted and used in the market microstructure literature include Lee and Ready's (1991) algorithm used in studies of price formation and informed trading (e.g., Brennan and Subrahmanyam (1995, 1998); Easley, Kiefer and O'Hara (1995); Harris and Schultz (1997); and Chakravarty and McConnell (1999)) and in studies measuring trading costs using effective spreads (e.g., Bessembinder (1997); Madhavan and Cheng (1997); and Kumar, Sarin and Shastri (1998)).

The second parameter input into the TMTM method is an estimate of trading propensity. A trade involves the search for a counterparty willing to accept a given transaction price. The likelihood that a trade will take place depends on the probability that the search for a counterparty will be successful. The bid-ask spread is a measure of the search costs, as well as the cost to the dealer of holding an inventory of shares. The narrower the bid-ask spread, the greater the likelihood of a trade (see, for example, Garbade (1978)). That is, the greater the probability of success in the search for the counterparty and the lower the dealer's inventory cost. Thus, the propensity to trade can be determined as a function of the bid-ask spread. Using readily publicly available data on the size of the daily average bid-ask spread, the trade propensity for shares bought on each date of the Class Period is determinable.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a depiction of a first step of the method in accordance with this invention for determining a maximum holding period share turnover;

DETAILED DESCRIPTION OF THE PREFERRED EMBODIMENTS

An arrangement for, and a method of, more accurately determining damages in shareholder class action litigation propose a theoretically-grounded microstructure trading model (TMTM) that is parameterized using publicly available data. The number of retained or damaged shares is determined using the TMTM method in accordance with this invention, and is then compared to the number determined from the known PTM and the TTM methods, all illustrated using publicly available data for Enron Corporation, by way of a non-limiting example.

All trading methods utilize the float, i.e., the number of shares that are available to trade. It is common practice to calculate the float by deducting from the total number of shares outstanding the number of shares held by insiders and institutions. The float on date t is denoted as $F_t$. To calculate the number of days it takes for the float to change hands, the ratio $F_t/V_t$ is computed where $V_t$ is equal to the total trading volume (less dealer and specialist trades) on date t. N denotes the number of days in the maximum investor holding period, i.e., the number of days required to turn over the total volume of traded shares outstanding over the Class Period. As shown in method step 1 of FIG. 1, N is calculated as follows:

$N$=Public Share Float/Adjusted Daily Volume=(Number of Shares Outstanding Less Institutional and Insider Holdings)/(Average Number of Shares Traded Less Market Maker and Specialist Trades)

Figure 2:
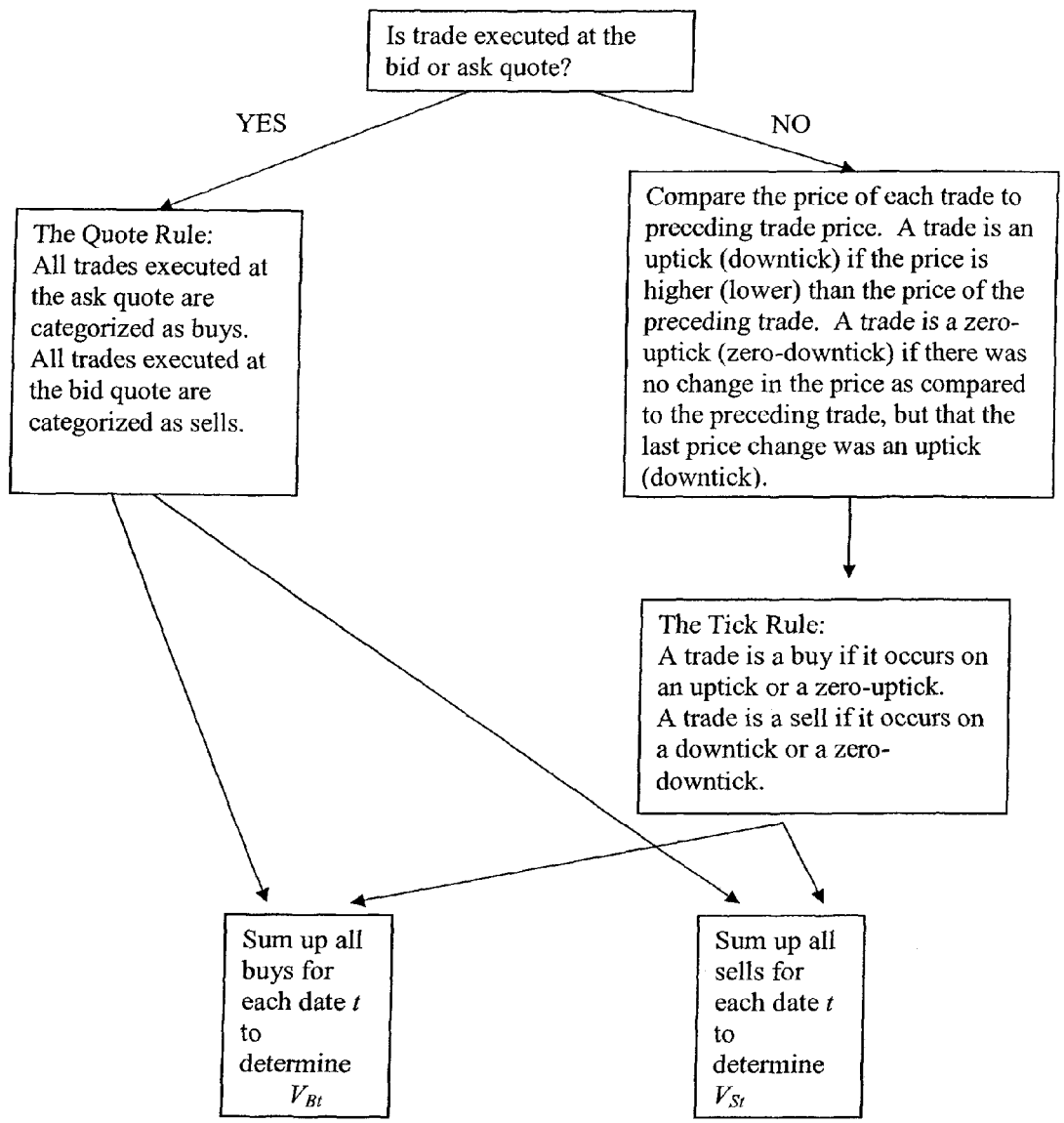
FIG. 2 is a flow chart depiction of a second step of the method in accordance with one embodiment of this invention, in which daily transaction volume is separated into daily sales and daily purchases.
Figure 3:
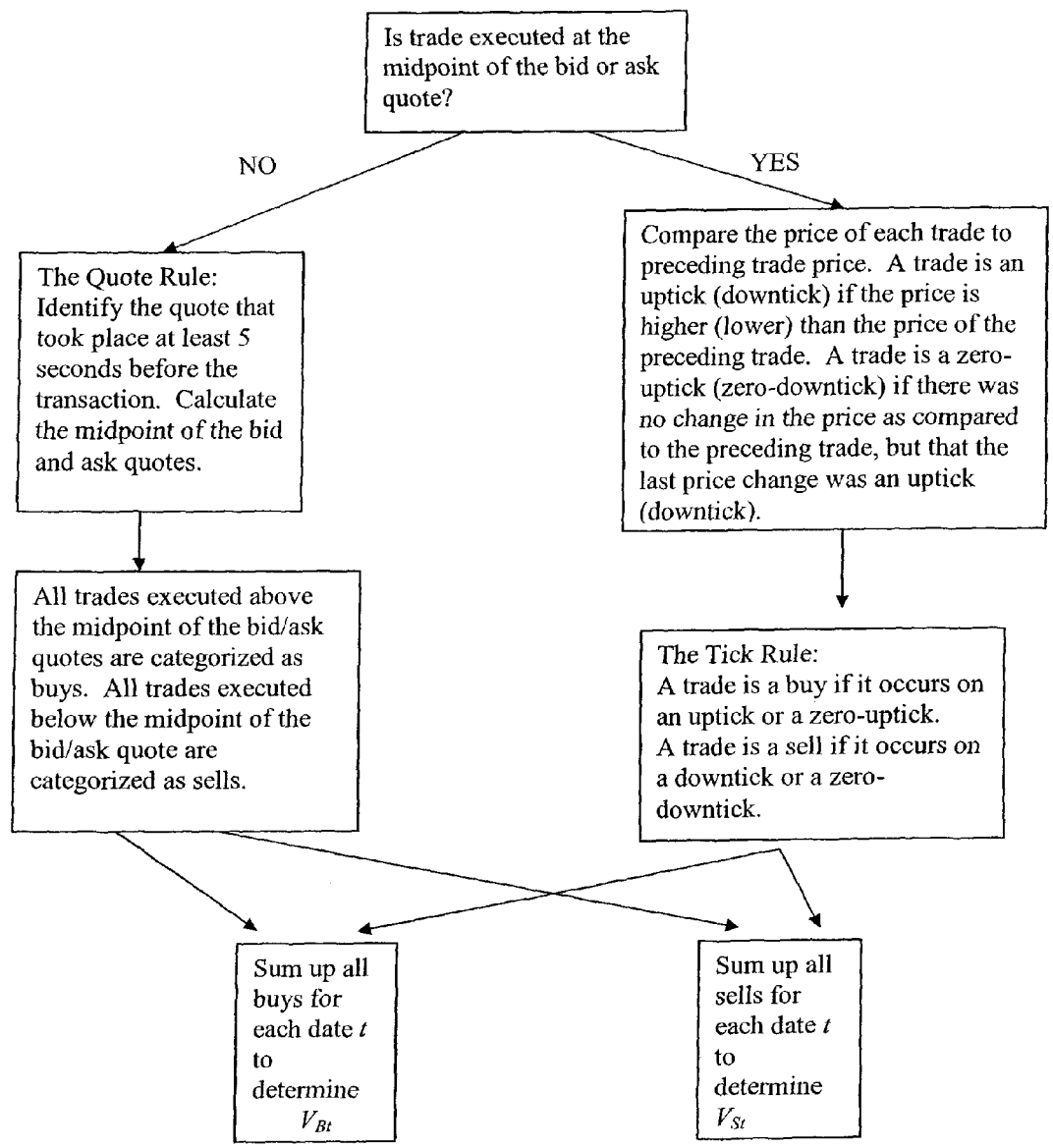
FIG. 3 is a flow chart depiction analogous to FIG. 2 of another embodiment of this invention, in which daily transaction volume is separated into daily sales and daily purchases.

Next, on any given date, the total trading volume (denoted $V_t$) can be divided into the number of buys (denoted $V_{Bt}$) and the number of sells (denoted $V_{St}$) using directional trading methods, such as the Lee and Ready (1991) or the Ellis, Michaely and O'Hara (2000) modified quote/tick rules, as shown in method step 2 (FIG. 2), or alternative method step 2' (FIG. 3), of the drawings, such that $V_{St}+V_{Bt}=V_t$.

The Ellis, Michaely and O'Hara (2000) rule categorizes all trades that are executed at the ask quote as buys and all trades executed at the bid quote as sells. The Lee and Ready (1991) rule is similar, except that it classifies trades as buys (sells) if they transact at a price above (below) the midpoint of the bid-ask spread, rather than at the ask quote (bid quote). All other trades are categorized by the tick rule, such that buys (sells) take place on an uptick or a zero-uptick (a downtick or a zero-downtick). A trade is a zero-uptick (zero-downtick) if there was no change in the transaction price as compared to the preceding trade, but that the last price change was an uptick (downtick).

The designation of trades as either buys or sells allows the number of shares purchased on each date of the Class Period to be determined. However, the determination of the retained damaged shares must reduce the number of damaged shares by the number of in-and-out shares purchased during the Class Period that are subsequently sold during the Class Period. Thus, the buyers' propensity to sell must be determined in order to determine whether the sold shares were originally bought during the Class Period or before.

As a simple first approximation, a microstructure-driven proportional trading rule is assumed. As described below, this will be replaced by a theoretically derived parameter value that allows for a continuum of trading intensities for any type of market participant. However, the assumption that all shares have the same probability of trade is a useful simplification for expositional purposes only. If all shares are equally likely to be traded, then the shares sold can be obtained from shareholders who bought their shares on any one of the last $F_t/V_t$ days, i.e., during the maximum holding period N.

For the purposes of the damage determination required herein, the days in the Class Period must be distinguished with those days before and after the Class Period. Let the Class Period extend from t=0, 1, T, where there are T days in the Class Period. Thus, days before the Class Period are denoted as t<0, days during the Class Period are denoted as 0≤t≤T, and days after the Class Period are denoted as t>T. Using the proportional assumption as a first approximation, the number of retained shares (denoted $RS_T$) is determined as follows:

$$RS_T = \sum_{t=0}^{T} \left\{ V_{Bt} - V_{St} \frac{\sum_{j=1}^{t} V_{B,t-j}}{\sum_{n=1}^{N} \mu_{t-n} V_{B,t-n}} \right\} \quad (1)$$

Equation (1) sums up for all days in the Class Period from t=0, . . . T, the total number of share purchases on each date in the Class Period ($V_{Bt}$) less the fraction of the shares that were sold ($V_{St}$) by traders who bought their shares during the Class Period, where T is the number of days in the Class Period. N denotes the number of days in the holding period; i.e., the maximum number of days required to turn over the total volume of traded shares outstanding over the Class Period.

Despite the restrictive assumption of proportional trading, the existing PTM, ATM and TTM methods have been improved by incorporating the theoretical underpinnings associated with methods that categorize trade direction. That is, buys and sells are distinguished so as to denote which shares are purchased during the Class Period and which are sold. This allows a more precise breakdown of total trading volume and therefore a more exact estimation of the number of retained shares.

However, it is also known to relate the propensity to trade (trading intensity) to the bid-ask spread. Financial intermediaries (FIs) that make markets, in particular securities, receive payment for their liquidity services in the form of the bid-ask spread. The bid-ask spread is wider, the higher the FIs' order processing costs, the greater the FIs' inventory holding costs, or the greater the adverse information costs, that is, the more uncertainty about the security's fundamental value. Thus, traders with a high propensity to trade will be less likely to purchase shares in illiquid markets with high bid-ask spreads. Indeed, the expected propensity to trade for a particular security can be estimated on a given date by examining the bid-ask spread in the market on the date in which the trader purchased the shares. This will provide a market measure of the security buyers' likelihood to subsequently sell their shares. Share purchases of less liquid shares signal a lower expected probability of a future trade (sale).

Figure 4:
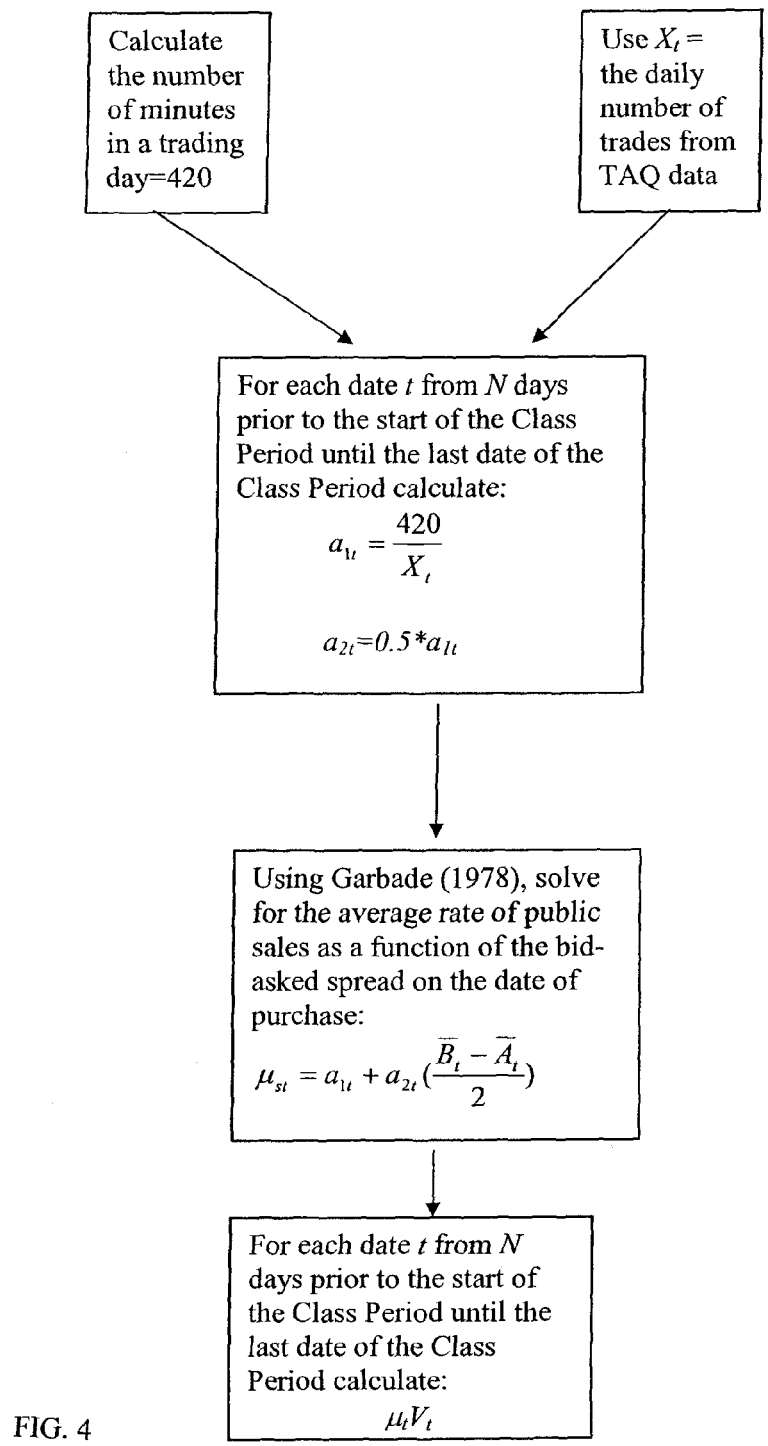
FIG. 4 is a flow chart depiction of a third step of the method in accordance with one embodiment of this invention, in which the daily average sales propensity is determined as a function of the daily bid-ask spread on the date of purchase.
Figure 5:
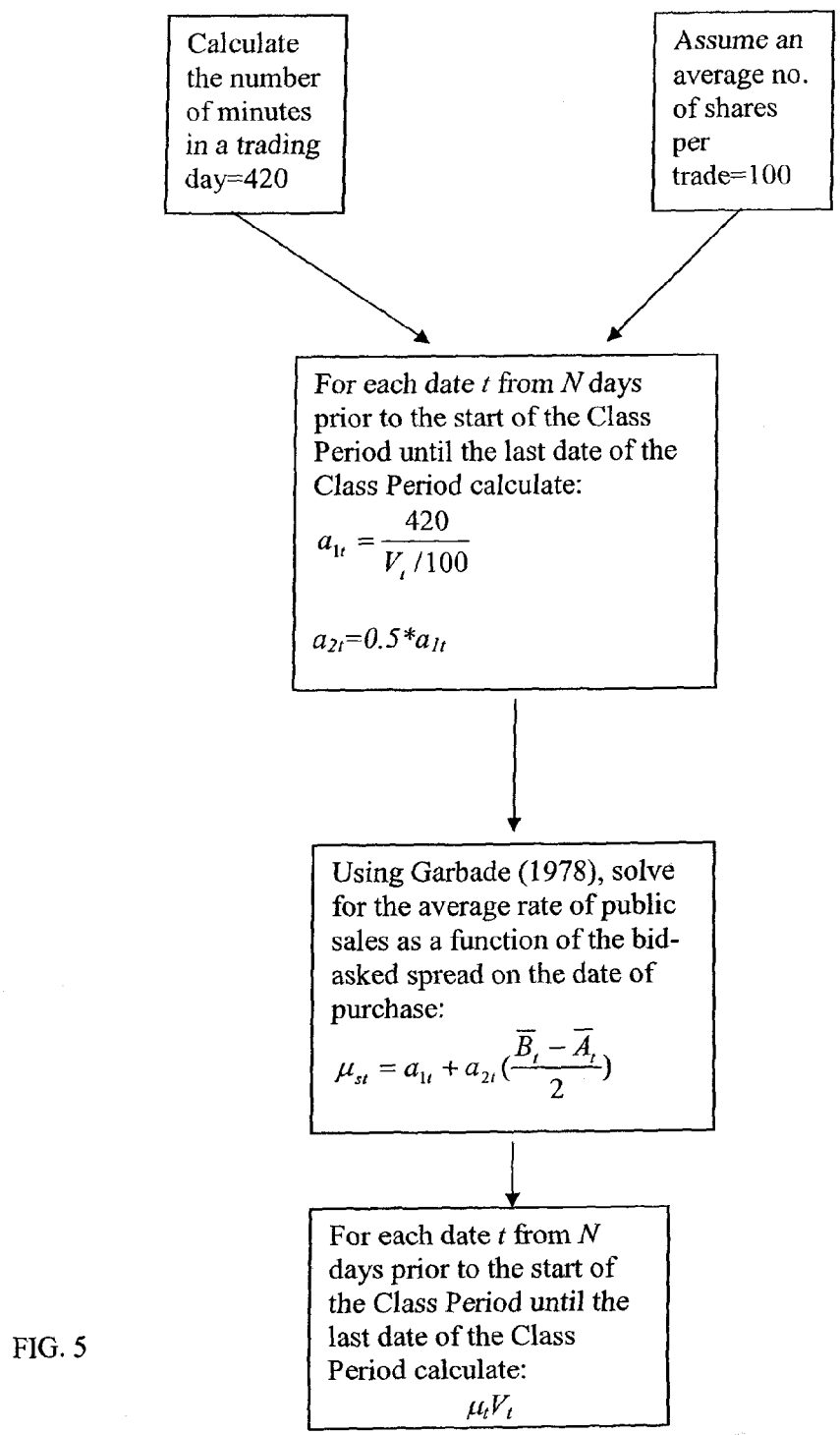
FIG. 5 is a flow chart depiction analogous to FIG. 4 of another embodiment of this invention, in which the daily average sales propensity is determined as a function of the daily bid-ask spread on the date of purchase.

Rather than arbitrarily assuming a trading intensity for one or more classes of traders, this invention proposes, as shown in method step 3 of FIG. 4, or in alternative method step 3' of FIG. 5, of the drawings, the determination of an average daily propensity to trade that is consistent with a continuum of trader types.

Garbade (1978) asserts that "the average rate of flow of purchase and sale orders from the public to the dealer community at any point in time is a function of average dealer quotations at that time and an exogenously specified equilibrium price." (p. 484). Equation (1), as well as the known PTM and TTM methods, assume that there is an equal probability of selling shares that were bought yesterday as compared to shares that were bought N days ago. Although the ATM method does not make this assumption, it instead makes arbitrary assumptions about the changes in the rate of trading intensity over time. Whether this is an accurate assumption can be determined using the method of trading propensity as a function of the bid-ask spread. Following Garbade (1978), the mean order arrival time of a sell order (by a retail trader) can be expressed as:

$$\mu_{st} = a_1 + a_2(\bar{B} - P^*) \text{ if } \bar{B} > P^* - (a_1/a_2) \text{ and } 0 \text{ otherwise} \quad (2)$$

where $\bar{B}$ is the average daily bid price and $P^*$ is the transaction price (assumed to be the midpoint of the bid and ask prices). Thus, if $\mu_{st}$ equals twenty trades per hour, that implies three minutes between trades. If there are seven hours in a trading day, then this stock has an average propensity to generate 140 sales per day. At a round lot of one-hundred shares, this implies an average sales propensity of 14,000 shares on date t.

Substituting the midpoint of the bid-ask quote for the transaction price $P^*$ yields:

$$\mu_{st} = a_1 + a_2\left(\frac{\bar{B} - \bar{A}}{2}\right) \text{ if } \bar{B} > P^* - (a_1/a_2) \text{ and } 0 \text{ otherwise} \quad (3)$$

where $a_1 > 0$ and $a_2 > 0$ and $\bar{B} - \bar{A} < 0$.

Equation (3) implies that the wider the bid-ask spread, the lower the probability of sales $\mu_{st}$. This is consistent with microstructure theory that suggests that trading intensity is inversely related to liquidity, i.e., the lower the bid-ask spread, the more liquid the stock, and the higher the propensity to trade ceterisparibus.

Figure 6:
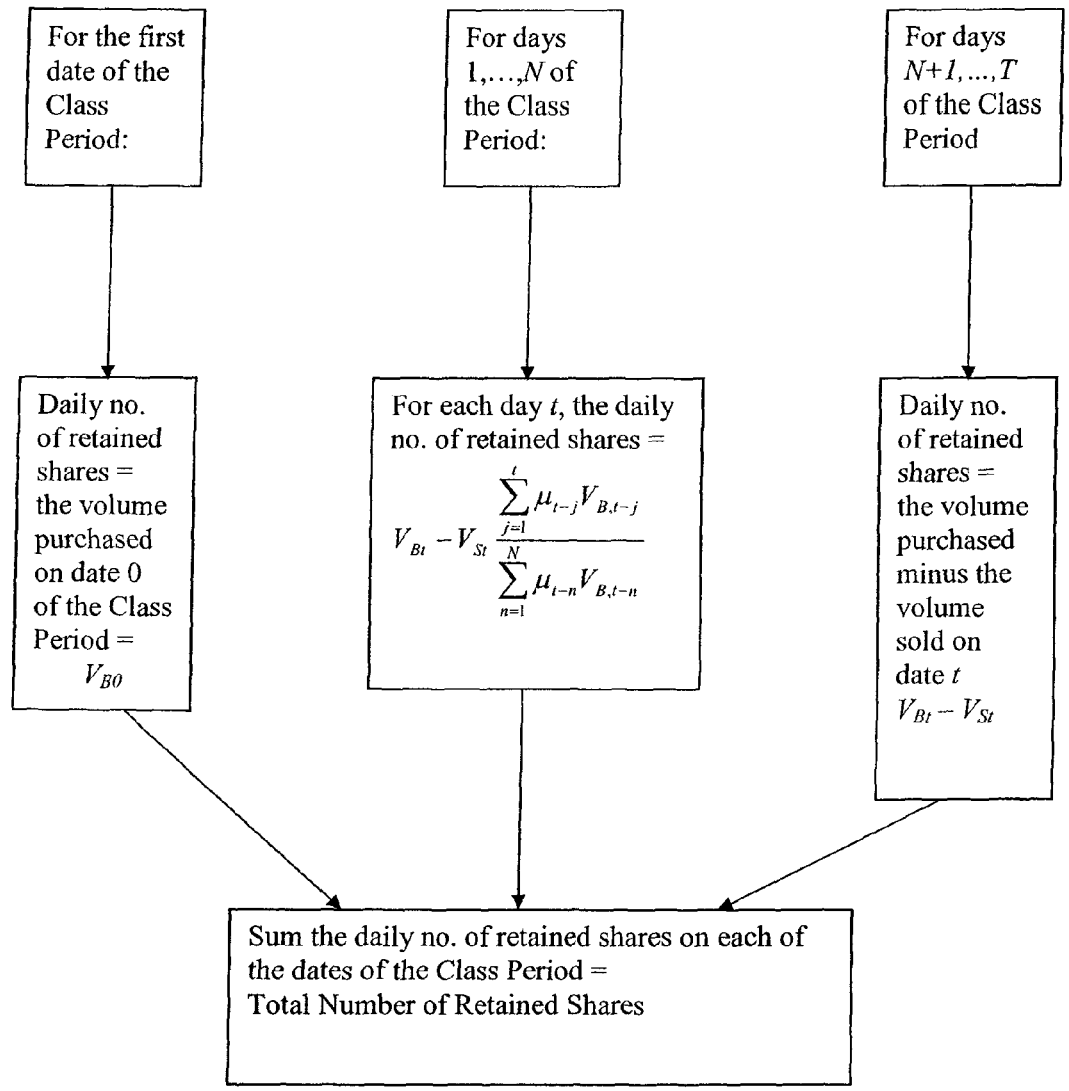
FIG. 6 is a flow chart depiction of a fourth step in accordance with the method of this invention for determining the total number of damaged shares over the class period.

Determining the sales propensity on any given purchase date t, the proportion of sales volume in equation (1) can be weighted by $\mu_{st}$ in order to solve for an endogenously determined acceleration factor, as shown in method step 4 of FIG. 6 of the drawings. Therefore, equation (1) can be rewritten as follows:

$$RS_T = \sum_{t=0}^{T} \left\{ V_{Bt} - V_{St} \frac{\sum_{j=1}^{t} \mu_{t-j} V_{B,t-j}}{\sum_{n=1}^{N} \mu_{t-n} V_{B,t-n}} \right\} \quad (1')$$

where $\mu_{st}$ is the daily sales probability. The value of $\mu_{st}$ is an endogenously determined random variable. That is, shares purchased on a given date also have an endogenously determined average propensity to be sold.

Figure 7:
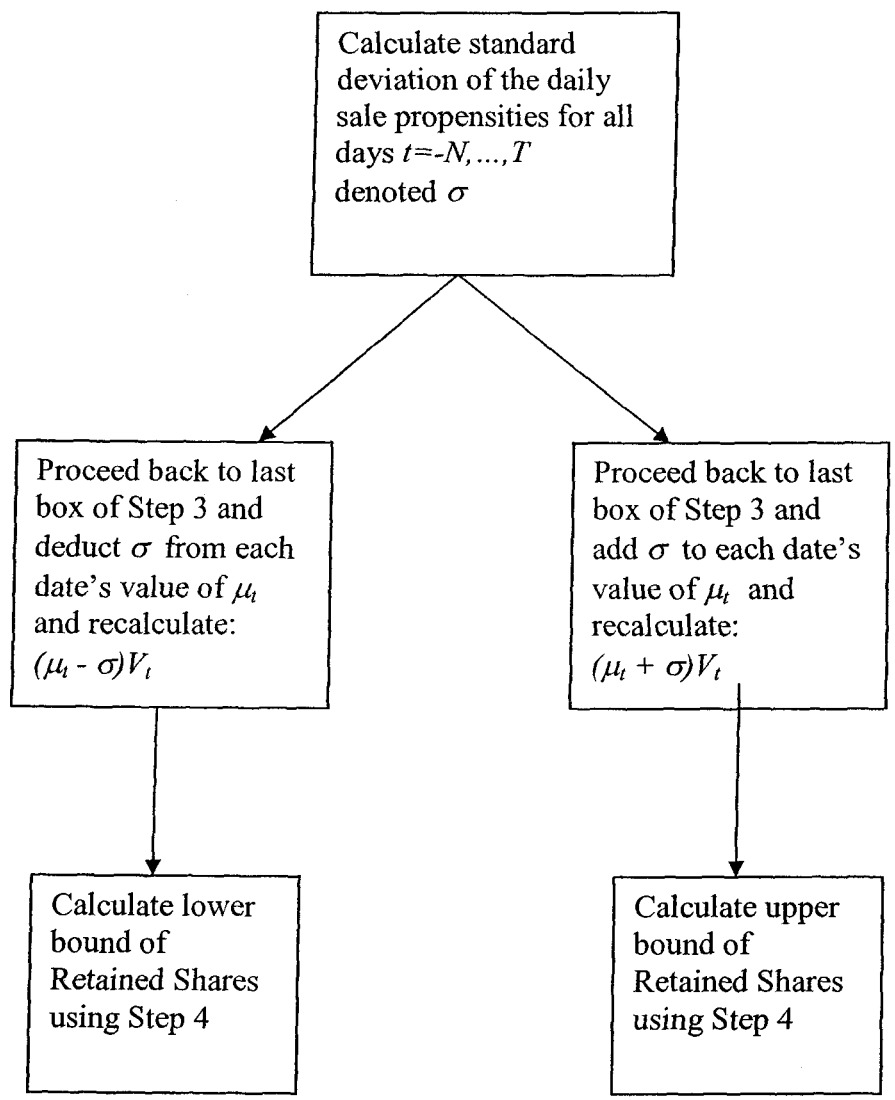
FIG. 7 is a flow chart depiction of a fifth step in accordance with the method of this invention, in which a confidence interval is obtained around an expected value of the damaged shares.

Using the mean of the trade probability distribution, a measure of share trade acceleration that is a function of the daily bid-ask spread can be derived and not simply arbitrarily assumed. Using the standard deviation of the probability distribution, as shown in method step 5 of FIG. 7 of the drawings, a confidence interval is defined around the mean, so as to arrive at the confidence interval of the range of retained shares calculations. The elapsed time between trades has an exponential probability density function. See Snyder (1975). Thus, the novel TMTM method meets the Daubert standards.

Publicly available data on Enron is employed herein in order to compare the results of the TMTM method to the PTM and the TTM methods. For the sake of this hypothetical example, let the Class Period extend from Dec. 29, 2000 to May 10, 2001 (90 days) and let the holdover turnover period be 90 days. Of course, the methods can be estimated for any Class Period and for any length of holdover turnover period. The periods chosen herein are for illustrative purposes only and do not correspond to the periods in actual class action litigation. Three different methods are now used to estimate the number of retained shares using the PTM, the TTM and the TMTM methods, and to compare their results.

The PTM method of Furbush and Smith (1994) is now estimated. The equation for the retained shares as of date t is shown as:

$$RS_t = RS_{t-1} + V_t\left(1 - \frac{RS_{t-1}}{F}\right) \quad (4)$$

where $RS_t$ is the cumulative retained shares as of date t, $V_t$ is the volume of trading on date t, and F is the float (total number of shares outstanding less the shares held by insiders and institutions).

An estimate of Enron's float over the Class Period is estimated as 213,672,332 shares. All three methods use the same float value and thus the comparative results are not sensitive to this measure. Table 1 shows the determination of the PTM method using equation (4) and daily volume data for the days of the Class Period (obtained from TAQ) and the average float of 213,672,332 shares. As shown in Table 1, the PTM method estimates that the retained shares as of the last date of the Class Period is 176,549,400 shares.

The PTM method assumes that all shares have an equal probability of trading on any given date. In contrast, the TTM method assumes that some traders have a greater propensity to trade than others. These high propensity security transactors are called traders, whereas the lower propensity, buy and hold participants are called investors. The Finnerty and Pushner (2003) TTM method assumes that investors have a fixed, assumed trading propensity on each date of the Class Period. The daily propensity for traders to transact is then derived. Finnerty and Pushner (2003) assume (without verification) that 33.3% of the float is held by traders and 66.7% is held by investors, who have a constant assumed daily trading probability of 0.2%. As in the estimation of the PTM method (and subsequently in the estimate of the TMTM method), the daily volume of transactions obtained from the TAQ database is utilized, as well as the total float of 213,672,332 shares. By assumption, there is no intraday trading by investors, but 20% of traders' net daily trades is assumed to be retraded by the same investors. Thus, the retention rate for investors is fixed at 99.8%, whereas the retention rate for traders fluctuates each day with the volume of transactions, averaging 95.7% over the Class Period.

Table 2 calculates the retained shares over the Class Period for the two types of traders. Investors are shown to have a total of 53,992,643 retained shares and traders a total of 23,738,767 shares. Thus, the TTM method determines that the total retained shares for damages calculation to be 77,731,410. The disparity between the PTM and the TTM methods' estimates of retained shares stems from assumed differences in method specifications and parameters. Since these assumptions are not, and cannot be, verified in the context of methods without any theoretical underpinnings, the veracity of either of these estimates cannot be validated.

The implicit assumption of the PTM method is that all shares have an equal probability of trading on each date of the Class Period. This trading intensity is calculated as the average daily volume of trades divided by the float. Using the data for the PTM method estimates shown in Table 1, this implies an average daily trading propensity of around 1.9%. However, this is simply an ad hoc estimation that is not grounded in any theory of market microstructure or method of trading behavior. Moreover, the TTM method makes equally arbitrary assumptions about trade propensity for each of the exogenously specified trader classes. That is, the daily trading propensity for investors is assumed to be 0.2%, whereas the daily trading propensity for traders averages 4.3%.

By contrast, in accordance with this invention, the TMTM method utilizes microstructure theory in order to determine each day's trading propensity as a continuous function of the daily bid-ask spread. Table 3 shows the TMTM method's determination of the daily average trading intensity for each date within the Class Period and for the 90 days prior to the start of the Class Period that constitutes the maximum turn-over holding period. As discussed above, the daily average trading propensity ($\mu_{s,t}$) is estimated using equation (3). The Garbade (1978) specification of $a_1$=average time between public orders=420/(No. of Trades Per day) is used where 420 minutes are the total number of minutes in a trading day, and $a_2$=0.5$a_1$. From Table 3, the daily average trading propensity varies across the days in the Class Period and therefore invalidates the assumption of a constant trading propensity for all traders (in the Furbush-Smith PTM method) or for investors (in the Finnerty-Pushner TTM method).

To estimate the number of retained shares, equation (I') requires the categorization of the daily volume of trades into sells and buys using the Lee and Ready (1991) and the Ellis, Michaely and O'Hara (2000) algorithms. Results using the Lee and Ready (1991) algorithm are shown in Table 4 and for the Ellis, Michaely and O'Hara (2000) algorithm in Table 5. All trades are classified on each date up to 90 days before the start of the Class Period until the end of the Class Period. Following Lee and Ready (1991), all trades are classified using quote data available five seconds prior to the transaction time. To classify early morning trades, the tick value of the last trades of the last trading day is used.

Table 6 compares the determination of the number of retained shares over the Class Period using the three methods. The PTM method of Furbush and Smith (1994) yields the highest estimate of 176,549,400 retained shares. The TTM method of Finnerty and Pushner (2003) yields the lowest estimate of 77,731,410 shares. The TMTM method yields retained shares estimates of between 95,652,351 to 113,151,273 shares. Moreover, the TMTM method generates critical parameter values using objective data applied to theories of the microstructure of security markets that are generally accepted by academics, regulators and practitioners.

In summary, the TMTM method uses actual publicly available market data, has well-accepted theoretical underpinnings, and is not subject to the same concerns associated with other known trading methods that rely on arbitrary assumptions to set key parameter values. Indeed, the TMTM method shows, for a specific example, that the fundamental assumption of the PTM and the TTM methods, i.e., constant daily trading intensities, is not met. Moreover, the TMTM method's determination of damages lies well within the extremes of the PTM and the TTM methods for a specific example. The novel TMTM method meets Daubert standards of reliability, general acceptance in the profession and accuracy of estimation as compared to the existing methods used to estimate retained shares for damages calculations in securities fraud litigation. The method steps 1-5 depicted in the drawings can be executed by a programmed computer under the control of a program.

TABLE 1

The Proportional Trading Model

| Days in the C.P. | Daily Volume | RS(t) |
| --- | --- | --- |
| 0 | 1,814,800 | 1,814,800 |
| 1 | 3,230,200 | 5,017,565 |
| 2 | 4,240,700 | 9,158,682 |
| 3 | 9,181,100 | 17,946,251 |
| 4 | 5,072,700 | 22,592,897 |
| 5 | 2,460,300 | 24,793,054 |
| 6 | 3,921,500 | 28,259,531 |
| 7 | 3,531,100 | 31,323,620 |
| 8 | 2,613,800 | 33,554,246 |
| 9 | 2,456,400 | 35,624,903 |
| 10 | 4,283,500 | 39,194,229 |
| 11 | 5,377,700 | 43,585,489 |
| 12 | 3,440,400 | 46,324,107 |
| 13 | 3,092,500 | 48,746,153 |
| 14 | 5,009,900 | 52,613,120 |
| 15 | 4,952,800 | 56,346,378 |
| 16 | 8,294,000 | 62,453,212 |
| 17 | 7,135,400 | 67,503,042 |
| 18 | 5,745,600 | 71,433,501 |
| 19 | 3,048,800 | 73,463,046 |
| 20 | 7,970,200 | 78,692,998 |
| 21 | 9,804,500 | 84,886,617 |
| 22 | 4,266,700 | 87,458,265 |
| 23 | 3,355,800 | 89,440,501 |
| 24 | 3,443,000 | 91,442,306 |
| 25 | 3,507,800 | 93,448,923 |
| 26 | 2,345,700 | 94,768,738 |

TABLE 1-continued

The Proportional Trading Model

| Days in the C.P. | Daily Volume | RS(t) |
|---|---|---|
| 27 | 3,390,500 | 96,655,471 |
| 28 | 1,873,100 | 97,681,267 |
| 29 | 1,936,400 | 98,732,433 |
| 30 | 2,829,200 | 100,254,333 |
| 31 | 2,031,600 | 101,332,714 |
| 32 | 4,522,700 | 103,710,553 |
| 33 | 3,300,200 | 105,408,928 |
| 34 | 2,300,300 | 106,574,443 |
| 35 | 3,012,600 | 108,084,433 |
| 36 | 3,320,800 | 109,725,433 |
| 37 | 3,083,500 | 111,225,488 |
| 38 | 3,040,300 | 112,683,183 |
| 39 | 2,914,500 | 114,060,680 |
| 40 | 4,054,600 | 115,950,889 |
| 41 | 4,168,500 | 117,857,321 |
| 42 | 2,299,700 | 118,888,554 |
| 43 | 2,668,200 | 120,072,151 |
| 44 | 3,443,800 | 121,580,724 |
| 45 | 4,161,400 | 123,374,265 |
| 46 | 2,958,700 | 124,624,613 |
| 47 | 2,655,400 | 125,731,249 |
| 48 | 6,090,300 | 128,237,832 |
| 49 | 5,884,600 | 130,590,724 |
| 50 | 6,124,600 | 132,972,135 |
| 51 | 8,064,000 | 136,017,763 |
| 52 | 4,311,700 | 137,584,756 |
| 53 | 3,426,700 | 138,804,986 |
| 54 | 4,211,100 | 140,280,488 |
| 55 | 9,842,500 | 143,661,174 |
| 56 | 10,233,000 | 147,014,085 |
| 57 | 7,729,200 | 149,425,323 |
| 58 | 4,113,200 | 150,662,080 |
| 59 | 3,717,400 | 151,758,312 |
| 60 | 3,488,200 | 152,769,058 |
| 61 | 5,721,300 | 154,399,807 |
| 62 | 3,717,100 | 155,430,927 |
| 63 | 3,087,400 | 156,272,470 |
| 64 | 3,224,500 | 157,138,684 |
| 65 | 2,883,000 | 157,901,471 |
| 66 | 3,899,000 | 158,919,153 |
| 67 | 4,911,800 | 160,177,794 |
| 68 | 2,481,700 | 160,799,107 |
| 69 | 3,689,400 | 161,712,049 |
| 70 | 3,266,200 | 162,506,315 |
| 71 | 2,112,700 | 163,012,223 |
| 72 | 3,681,800 | 163,885,150 |
| 73 | 4,758,400 | 164,993,891 |
| 74 | 6,189,200 | 166,403,903 |
| 75 | 3,704,300 | 167,223,366 |
| 76 | 3,111,000 | 167,899,648 |
| 77 | 3,045,500 | 168,552,052 |
| 78 | 2,779,100 | 169,138,903 |
| 79 | 2,615,200 | 169,683,961 |
| 80 | 3,774,700 | 170,461,052 |
| 81 | 2,217,200 | 170,909,440 |
| 82 | 2,263,200 | 171,362,381 |
| 83 | 1,762,900 | 171,711,458 |
| 84 | 4,200,500 | 172,536,350 |
| 85 | 3,971,600 | 173,300,959 |
| 86 | 2,741,500 | 173,818,939 |
| 87 | 3,433,500 | 174,459,344 |
| 88 | 5,186,900 | 175,411,240 |
| 89 | 3,959,700 | 176,120,281 |
| 90 | 2,441,700 | 176,549,400 |

RS(t) is calculated using the Furbush and Smith (1994) model.
$RS_i = RS_{i-1} + V_i(1-(RS_{i-1}/F))$

TABLE 2

Calculating the Retained Shares Using the Two Trader Model (Finnerty and Pushner, 2003)

| | Bought on Day No: | | | | | | | |
|---|---|---|---|---|---|---|---|---|
| | 1 | 2 | 3 | 4 | 5 | 6 | 7 | 8 |
| Trader Retained Shares | 238,084 | 238,561 | 239,039 | 239,517 | 239,997 | 240,477 | 240,959 | 241,441 |
| Investor Retained Shares | 21,638 | 36,443 | 46,047 | 75,038 | 60,554 | 37,315 | 55,295 | 53,467 |

| | Bought on Day No: | | | | | | | |
|---|---|---|---|---|---|---|---|---|
| | 16 | 17 | 18 | 19 | 20 | 21 | 22 | 23 |
| Trader Retained Shares | 245,335 | 245,826 | 246,319 | 246,812 | 247,306 | 247,801 | 248,297 | 248,794 |
| Investor Retained Shares | 93,617 | 132,286 | 135,047 | 129,833 | 89,291 | 171,203 | 207,091 | 145,912 |

| | Bought on Day No: | | | | | | | |
|---|---|---|---|---|---|---|---|---|
| | 31 | 32 | 33 | 34 | 35 | 36 | 37 | 38 |
| Trader Retained Shares | 252,807 | 253,313 | 253,820 | 254,328 | 254,837 | 255,348 | 255,859 | 256,371 |
| Investor Retained Shares | 138,504 | 138,504 | 206,406 | 173,067 | 179,322 | 170,942 | 190,491 | 186,348 |

| | Bought on Day No: | | | | | | | |
|---|---|---|---|---|---|---|---|---|
| | 46 | 47 | 48 | 49 | 50 | 51 | 52 | 53 |
| Trader Retained Shares | 260,506 | 261,027 | 261,550 | 262,074 | 262,598 | 263,124 | 263,651 | 264,179 |
| Investor Retained Shares | 306,652 | 248,644 | 234,746 | 433,976 | 455,992 | 499,050 | 620,116 | 471,524 |

| | Bought on Day No: | | | | | | | |
|---|---|---|---|---|---|---|---|---|
| | 61 | 62 | 63 | 64 | 65 | 66 | 67 | 68 |
| Trader Retained Shares | 268,440 | 268,977 | 269,515 | 270,055 | 270,596 | 271,137 | 271,680 | 272,224 |
| Investor Retained Shares | 699,524 | 1,013,534 | 812,556 | 734,767 | 785,674 | 744,111 | 966,128 | 1,179,504 |

TABLE 2-continued

| | Bought on Day No: | | | | | | | |
|---|---|---|---|---|---|---|---|---|
| | 76 | 77 | 78 | 79 | 80 | 81 | 82 | 83 |
| Trader Retained Shares | 276,615 | 277,168 | 277,723 | 278,279 | 278,837 | 279,395 | 279,954 | 280,515 |
| Investor Retained Shares | 1,366,853 | 1,246,398 | 1,267,001 | 1,215,268 | 1,189,422 | 1,630,473 | 1,102,683 | 1,148,902 |

| | Bought on Day No: | | | | | | |
|---|---|---|---|---|---|---|---|
| | 9 | 10 | 11 | 12 | 13 | 14 | 15 |
| Trader Retained Shares | 241,924 | 242,409 | 242,894 | 243,380 | 243,868 | 244,356 | 244,845 |
| Investor Retained Shares | 43,726 | 42,609 | 67,252 | 81,760 | 63,982 | 61,156 | 89,151 |

| | Bought on Day No: | | | | | | |
|---|---|---|---|---|---|---|---|
| | 24 | 25 | 26 | 27 | 28 | 29 | 30 |
| Trader Retained Shares | 249,292 | 249,791 | 250,291 | 250,792 | 251,295 | 251,798 | 252,302 |
| Investor Retained Shares | 128,513 | 135,867 | 143,010 | 107,012 | 148,319 | 92,389 | 97,163 |

| | Bought on Day No: | | | | | | |
|---|---|---|---|---|---|---|---|
| | 39 | 40 | 41 | 42 | 43 | 44 | 45 |
| Trader Retained Shares | 256,884 | 257,399 | 257,914 | 258,430 | 258,948 | 259,466 | 259,985 |
| Investor Retained Shares | 190,439 | 190,150 | 251,700 | 268,320 | 175,579 | 204,399 | 257,569 |

| | Bought on Day No: | | | | | | |
|---|---|---|---|---|---|---|---|
| | 54 | 55 | 56 | 57 | 58 | 59 | 60 |
| Trader Retained Shares | 264,708 | 265,237 | 265,768 | 266,301 | 266,834 | 267,368 | 267,903 |
| Investor Retained Shares | 419,156 | 504,947 | 852,769 | 975,099 | 966,360 | 723,452 | 704,176 |

| | Bought on Day No: | | | | | | |
|---|---|---|---|---|---|---|---|
| | 69 | 70 | 71 | 72 | 73 | 74 | 75 |
| Trader Retained Shares | 272,769 | 273,315 | 273,862 | 274,411 | 274,960 | 275,510 | 276,062 |
| Investor Retained Shares | 746,065 | 1,050,187 | 997,464 | 715,049 | 1,154,990 | 1,436,184 | 1,779,301 |

| | Bought on Day No: | | | | | | |
|---|---|---|---|---|---|---|---|
| | 84 | 85 | 86 | 87 | 88 | 89 | 90 |
| Trader Retained Shares | 281,076 | 281,639 | 282,203 | 282,768 | 283,334 | 283,901 | 284,469 |
| Investor Retained Shares | 922,149 | 1,951,953 | 1,965,820 | 1,544,065 | 1,899,583 | 2,621,424 | 2,320,206 |

| | |
|---|---|
| Total Number of Trader Retained Shares | 23,738,767 |
| Total Number of Investor Retained Shares | 53,992,643 |
| Total Number of Retained Shares Using the TTM, Finnerty and Pushner (2003) | 77,731,410 |

TABLE 3

ESTIMATING THE DAILY AVERAGE TRADING PROPENSITY USING THE TMTM

| Day No. | VOLUME | Propensity |
|---|---|---|
| −91 | 1,504,500 | 0.1283 |
| −90 | 1,557,000 | 0.1131 |
| −89 | 2,703,900 | 0.0226 |
| −88 | 2,941,800 | 0.0000 |
| −87 | 1,984,800 | 0.0647 |
| −86 | 1,886,300 | 0.0831 |
| −85 | 1,379,700 | 0.1191 |
| −84 | 1,488,300 | 0.1552 |
| −83 | 2,258,100 | 0.1823 |
| −82 | 1,776,400 | 0.0987 |
| −81 | 1,718,000 | 0.1281 |
| −80 | 4,258,600 | 0.0632 |
| −79 | 2,741,400 | 0.0805 |
| −78 | 1,449,600 | 0.1019 |
| −77 | 2,647,200 | 0.0815 |
| −76 | 5,214,700 | 0.1292 |
| −75 | 1,616,100 | 0.1312 |
| −74 | 2,687,700 | 0.1244 |
| −73 | 4,092,700 | 0.0602 |
| −72 | 2,691,000 | 0.0922 |
| −71 | 3,214,300 | 0.0000 |
| −70 | 4,450,500 | 0.0000 |
| −69 | 3,127,600 | 0.0000 |
| −68 | 2,818,200 | 0.0092 |
| −67 | 2,594,700 | 0.1008 |
| −66 | 3,082,200 | 0.1288 |
| −65 | 1,901,800 | 0.0737 |
| −64 | 2,012,400 | 0.1177 |
| −63 | 2,363,500 | 0.0039 |
| −62 | 2,244,200 | 0.0199 |
| −61 | 2,240,100 | 0.1763 |
| −60 | 2,777,100 | 0.0485 |
| −59 | 2,253,900 | 0.1483 |
| −58 | 1,994,400 | 0.0875 |
| −57 | 1,609,900 | 0.1497 |
| −56 | 2,021,400 | 0.1049 |

TABLE 3-continued

ESTIMATING THE DAILY AVERAGE TRADING PROPENSITY USING THE TMTM

| Day No. | VOLUME | Propensity |
|---|---|---|
| −55 | 1,634,800 | 0.0852 |
| −54 | 2,297,700 | 0.0237 |
| −53 | 2,045,700 | 0.1091 |
| −52 | 1,635,100 | 0.1331 |
| −51 | 2,371,800 | 0.0219 |
| −50 | 2,549,900 | 0.0635 |
| −49 | 1,933,400 | 0.1737 |
| −48 | 1,804,900 | 0.1099 |
| −47 | 2,302,700 | 0.0507 |
| −46 | 1,516,300 | 0.0518 |
| −45 | 2,169,200 | 0.0000 |
| −44 | 2,189,400 | 0.0766 |
| −43 | 1,583,200 | 0.2016 |
| −42 | 1,831,100 | 0.1350 |
| −41 | 2,153,100 | 0.0193 |
| −40 | 2,649,600 | 0.1693 |
| −39 | 2,693,700 | 0.1056 |
| −38 | 3,310,300 | 0.0000 |
| −37 | 3,147,900 | 0.0000 |
| −36 | 1,959,200 | 0.0943 |
| −35 | 1,791,200 | 0.2835 |
| −34 | 2,077,700 | 0.2373 |
| −33 | 2,331,300 | 0.3159 |
| −32 | 2,239,900 | 0.0000 |
| −31 | 2,354,200 | 0.2248 |
| −30 | 1,899,900 | 0.2221 |
| −29 | 1,310,400 | 0.2221 |
| −28 | 1,973,500 | 0.1621 |
| −27 | 1,869,300 | 0.1769 |
| −26 | 1,554,500 | 0.1444 |
| −25 | 4,046,600 | 0.0000 |
| −24 | 1,128,600 | 0.2417 |
| −23 | 1,504,100 | 0.2222 |
| −22 | 1,405,100 | 0.2462 |
| −21 | 6,545,300 | 0.0000 |
| −20 | 10,863,800 | 0.0000 |
| −19 | 5,640,100 | 0.0000 |
| −18 | 2,390,800 | 0.0261 |
| −17 | 3,609,600 | 0.0722 |
| −16 | 3,854,000 | 0.0000 |
| −15 | 2,830,500 | 0.1318 |
| −14 | 3,765,100 | 0.0108 |
| −13 | 2,835,800 | 0.0000 |
| −12 | 1,892,100 | 0.1011 |
| −11 | 2,988,100 | 0.0000 |
| −10 | 3,804,600 | 0.0344 |
| −9 | 5,272,200 | 0.0311 |
| −8 | 2,107,700 | 0.0795 |
| −7 | 2,657,100 | 0.1649 |
| −6 | 3,112,300 | 0.1245 |
| −5 | 2,890,300 | 0.1607 |
| −4 | 1,953,300 | 0.0955 |
| −3 | 3,063,6000 | 0.0436 |
| −2 | 3,184,800 | 0.0000 |
| −1 | 2,073,800 | 0.0907 |
| 0 | 1,814,800 | 0.0891 |
| 1 | 3,230,200 | 0.0000 |
| 2 | 4,240,700 | 0.0000 |
| 3 | 9,181,100 | 0.0141 |
| 4 | 5,072,700 | 0.0798 |
| 5 | 2,460,300 | 0.1120 |
| 6 | 3,921,500 | 0.0000 |
| 7 | 3,531,100 | 0.0460 |
| 8 | 2,613,800 | 0.0778 |
| 9 | 2,456,400 | 0.0915 |
| 10 | 4,283,500 | 0.0521 |
| 11 | 5,377,700 | 0.0000 |
| 12 | 3,440,400 | 0.1185 |
| 13 | 3,092,500 | 0.0817 |
| 14 | 5,009,900 | 0.0389 |
| 15 | 4,952,800 | 0.0720 |
| 16 | 8,294,000 | 0.0021 |
| 17 | 7,135,400 | 0.0310 |
| 18 | 5,745,600 | 0.1020 |
| 19 | 3,048,800 | 0.1447 |
| 20 | 7,970,200 | 0.0890 |
| 21 | 9,804,500 | 0.1087 |
| 22 | 4,266,700 | 0.0959 |
| 23 | 3,355,800 | 0.1051 |
| 24 | 3,443,000 | 0.0806 |
| 25 | 3,507,800 | 0.1404 |
| 26 | 2,345,700 | 0.1398 |
| 27 | 3,390,500 | 0.1278 |
| 28 | 1,873,100 | 0.1552 |
| 29 | 1,936,400 | 0.1613 |
| 30 | 2,829,200 | 0.0717 |
| 31 | 2,031,600 | 0.1605 |
| 32 | 4,522,700 | 0.0000 |
| 33 | 3,300,200 | 0.0378 |
| 34 | 2,300,300 | 0.1042 |
| 35 | 3,012,600 | 0.0635 |
| 36 | 3,320,800 | 0.0670 |
| 37 | 3,083,500 | 0.0602 |
| 38 | 3,040,300 | 0.0675 |
| 39 | 2,914,500 | 0.0988 |
| 40 | 4,054,600 | 0.1011 |
| 41 | 4,168,500 | 0.0991 |
| 42 | 2,299,700 | 0.1028 |
| 43 | 2,668,200 | 0.1548 |
| 44 | 3,443,800 | 0.0762 |
| 45 | 4,161,400 | 0.1232 |
| 46 | 2,958,700 | 0.1579 |
| 47 | 2,655,400 | 0.0561 |
| 48 | 6,090,300 | 0.0000 |
| 49 | 5,884,600 | 0.0658 |
| 50 | 6,124,600 | 0.0117 |
| 51 | 8,064,000 | 0.0072 |
| 52 | 4,311,700 | 0.0000 |
| 53 | 3,426,700 | 0.1044 |
| 54 | 4,211,100 | 0.1342 |
| 55 | 9,842,500 | 0.0000 |
| 56 | 10,233,000 | 0.0003 |
| 57 | 7,729,200 | 0.0000 |
| 58 | 4,113,200 | 0.0875 |
| 59 | 3,717,400 | 0.0681 |
| 60 | 3,488,200 | 0.0497 |
| 61 | 5,721,300 | 0.0023 |
| 62 | 3,717,100 | 0.0146 |
| 63 | 3,087,400 | 0.0236 |
| 64 | 3,224,500 | 0.0209 |
| 65 | 2,883,000 | 0.0926 |
| 66 | 3,899,000 | 0.0742 |
| 67 | 4,911,800 | 0.0086 |
| 68 | 2,481,700 | 0.0547 |
| 69 | 3,689,400 | 0.0280 |
| 70 | 3,266,200 | 0.1242 |
| 71 | 2,112,700 | 0.1449 |
| 72 | 3,681,800 | 0.0621 |
| 73 | 4,758,400 | 0.0915 |
| 74 | 6,189,200 | 0.0452 |
| 75 | 3,704,300 | 0.1144 |
| 76 | 3,111,000 | 0.0826 |
| 77 | 3,045,500 | 0.1108 |
| 78 | 2,779,100 | 0.1317 |
| 79 | 2,615,200 | 0.1073 |
| 80 | 3,774,700 | 0.1597 |
| 81 | 2,217,200 | 0.1566 |
| 82 | 2,263,200 | 0.0734 |
| 83 | 1,762,900 | 0.1010 |
| 84 | 4,200,500 | 0.0032 |
| 85 | 3,971,600 | 0.0306 |
| 86 | 2,741,500 | 0.1221 |
| 87 | 3,433,500 | 0.0679 |
| 88 | 5,186,900 | 0.0674 |
| 89 | 3,959,700 | 0.0201 |
| 90 | 2,441,700 | 0.0939 |
| AVERAGE | | 0.0712 |

Calculation of the daily average sales propensity using Garbade (1978). $\mu_{st} = a_1 + a_2 (\bar{B} - P^*)$ where $a1 = 420/\text{No. of Trades Per Day}$ and $a2 = 5a1$

TABLE 4

Retained Shares Using the TMTM
Lee and Ready (1991) Algorithm

| Day No. | Retained Shares |
|---|---|
| 0 | 971,800 |
| 1 | 1,615,977 |
| 2 | 2,028,629 |
| 3 | 3,904,019 |
| 4 | 2,633,944 |
| 5 | 1,094,176 |
| 6 | 1,490,290 |
| 7 | 1,398,318 |
| 8 | 1,330,041 |
| 9 | 1,350,455 |
| 10 | 1,107,305 |
| 11 | 2,584,345 |
| 12 | 2,004,084 |
| 13 | 1,373,094 |
| 14 | 2,696,785 |
| 15 | 3,053,542 |
| 16 | 3,729,331 |
| 17 | 3,352,513 |
| 18 | 3,220,591 |
| 19 | 1,219,177 |
| 20 | 4,379,624 |
| 21 | 5,977,782 |
| 22 | 1,079,452 |
| 23 | 1,429,234 |
| 24 | 1,754,075 |
| 25 | 1,152,802 |
| 26 | 504,174 |
| 27 | 1,197,239 |
| 28 | 714,742 |
| 29 | 733,245 |
| 30 | 1,275,783 |
| 31 | 759,092 |
| 32 | 1,011,778 |
| 33 | 456,528 |
| 34 | 333,690 |
| 35 | 487,694 |
| 36 | 682,032 |
| 37 | 854,814 |
| 38 | 665,987 |
| 39 | 588,379 |
| 40 | 1,373,567 |
| 41 | 789,750 |
| 42 | 879,842 |
| 43 | 119,496 |
| 44 | 0 |
| 45 | 176,468 |
| 46 | 349,000 |
| 47 | 0 |
| 48 | 0 |
| 49 | 943,427 |
| 50 | 1,078,740 |
| 51 | 3,267,046 |
| 52 | 968,434 |
| 53 | 464,216 |
| 54 | 0 |
| 55 | 642,065 |
| 56 | 1,459,798 |
| 57 | 1,708,040 |
| 58 | 722,244 |
| 59 | 631,783 |
| 60 | 0 |
| 61 | 0 |
| 62 | 156,344 |
| 63 | 49,266 |
| 64 | 0 |
| 65 | 0 |
| 66 | 401,386 |
| 67 | 0 |
| 68 | 673,857 |
| 69 | 1,414,320 |
| 70 | 318,117 |
| 71 | 0 |
| 72 | 607,789 |
| 73 | 0 |
| 74 | 1,340,618 |

TABLE 4-continued

Retained Shares Using the TMTM
Lee and Ready (1991) Algorithm

| Day No. | Retained Shares |
|---|---|
| 75 | 54,601 |
| 76 | 542,486 |
| 77 | 978,065 |
| 78 | 510,689 |
| 79 | 1,172,280 |
| 80 | 1,538,071 |
| 81 | 302,098 |
| 82 | 344,117 |
| 83 | 140,796 |
| 84 | 0 |
| 85 | 0 |
| 86 | 52,274 |
| 87 | 0 |
| 88 | 0 |
| 89 | 1,284,698 |
| 90 | 0 |
| TOTAL | 95,652,351 |

TABLE 5

RETAINED SHARES USING THE TMTM
Ellis, Michaely & O'Hara (2000) Algorithm

| Day No. | Retained Shares |
|---|---|
| 0 | 951,600 |
| 1 | 1,507,466 |
| 2 | 1,948,255 |
| 3 | 4,192,201 |
| 4 | 2,539,562 |
| 5 | 1,079,224 |
| 6 | 1,616,831 |
| 7 | 1,567,190 |
| 8 | 1,252,708 |
| 9 | 1,375,092 |
| 10 | 1,735,584 |
| 11 | 2,423,795 |
| 12 | 1,835,099 |
| 13 | 1,144,920 |
| 14 | 2,726,891 |
| 15 | 2,774,508 |
| 16 | 4,353,766 |
| 17 | 3,308,778 |
| 18 | 2,970,011 |
| 19 | 1,312,309 |
| 20 | 5,011,160 |
| 21 | 6,304,371 |
| 22 | 1,680,682 |
| 23 | 1,430,038 |
| 24 | 1,771,823 |
| 25 | 1,853,115 |
| 26 | 917,558 |
| 27 | 1,362,455 |
| 28 | 836,086 |
| 29 | 746,311 |
| 30 | 1,396,109 |
| 31 | 761,741 |
| 32 | 1,441,245 |
| 33 | 820,552 |
| 34 | 744,105 |
| 35 | 990,477 |
| 36 | 1,307,348 |
| 37 | 652,305 |
| 38 | 1,056,649 |
| 39 | 874,917 |
| 40 | 1,597,450 |
| 41 | 1,239,205 |
| 42 | 916,641 |
| 43 | 734,795 |
| 44 | 597,319 |
| 45 | 475,923 |

TABLE 5-continued

RETAINED SHARES USING THE TMTM
Ellis, Michaely & O'Hara (2000) Algorithm

| Day No. | Retained Shares |
| --- | --- |
| 46 | 552,773 |
| 47 | 268,203 |
| 48 | 298,132 |
| 49 | 1,854,274 |
| 50 | 2,153,912 |
| 51 | 3,129,437 |
| 52 | 891,444 |
| 53 | 684,194 |
| 54 | 973,566 |
| 55 | 1,322,693 |
| 56 | 2,224,765 |
| 57 | 2,252,667 |
| 58 | 1,062,970 |
| 59 | 615,360 |
| 60 | 206,759 |
| 61 | 441,664 |
| 62 | 726,524 |
| 63 | 533,601 |
| 64 | 226,188 |
| 65 | 610,278 |
| 66 | 426,945 |
| 67 | 416,955 |
| 68 | 924,703 |
| 69 | 1,037,265 |
| 70 | 133,781 |
| 71 | 421,547 |
| 72 | 798,777 |
| 73 | 819,659 |
| 74 | 1,269,999 |
| 75 | 0 |
| 76 | 637,523 |
| 77 | 1,002,831 |
| 78 | 437,275 |
| 79 | 637,704 |
| 80 | 1,056,581 |
| 81 | 401,360 |
| 82 | 47,616 |
| 83 | 290,594 |
| 84 | 385,199 |
| 85 | 0 |
| 86 | 95,233 |
| 87 | 0 |
| 88 | 0 |
| 89 | 743,295 |
| 90 | 856 |
| TOTAL | 113,151,273 |

TABLE 6

Summary of Methods

| | | Estimated Retained Shares |
| --- | --- | --- |
| PTM | Furbush Smith (1994) | 176,549,400 |
| TTM | Finnerty Pushner (2003) | 77,731,410 |
| TMTM | Using Lee Ready (1991) | 95,652,351 |
| | Using Ellis, Michaely & O'Hara (2000) | 113,151,273 |

Figure 8:
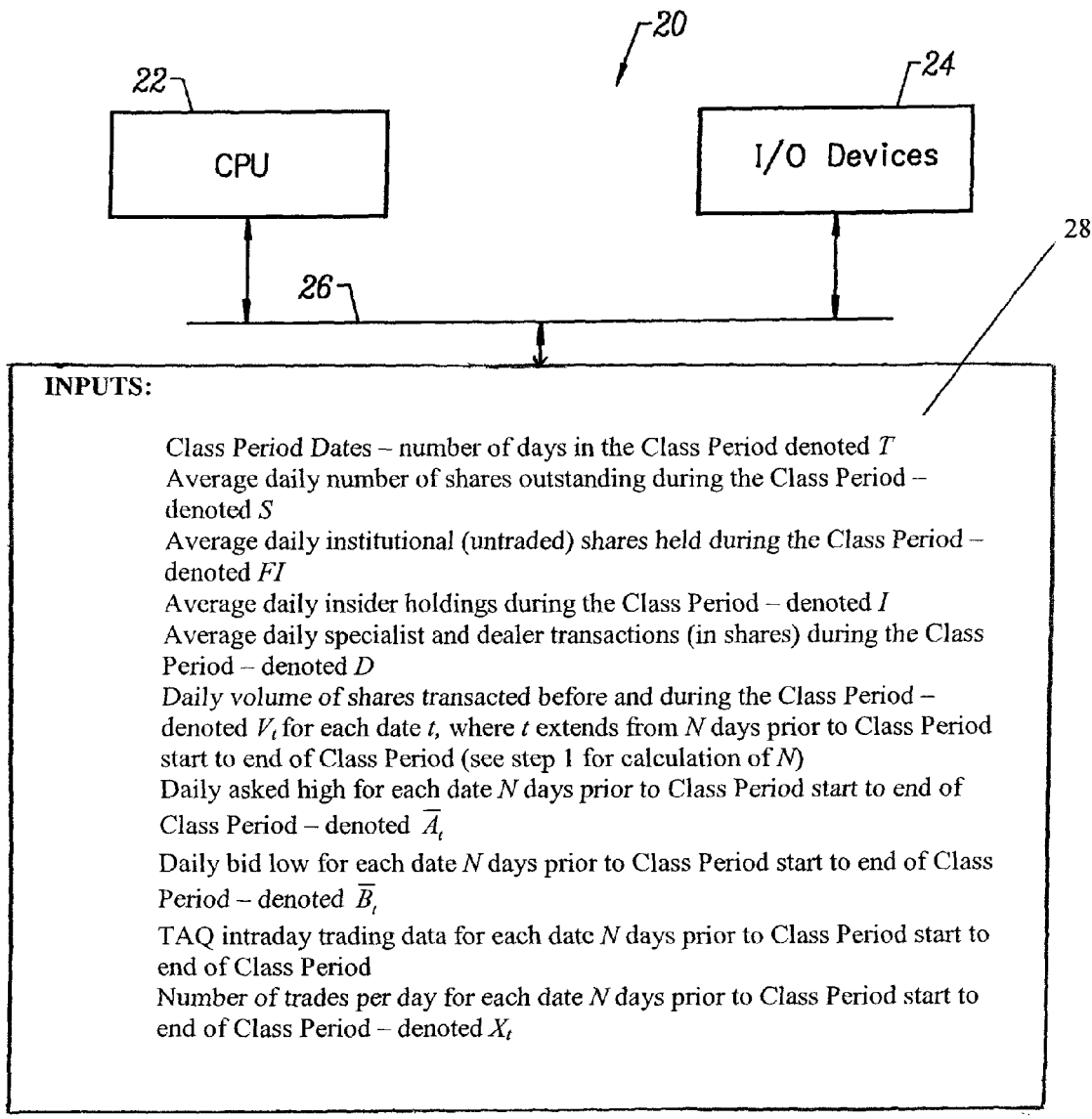
FIG. 8 illustrates a general purpose computer configured to execute the method of this invention, including a plurality of inputs for entry into the computer.

FIG. 8 illustrates a general purpose computer 20 constructed to implement the present invention. The computer 20 includes a central processing unit (CPU) 22 which communicates with a set of input/output (I/O) devices 24 over a bus 26. The I/O devices 24 may include a keyboard, mouse, video monitor, printer, etc. The CPU 22 also communicates with a memory 28 over the bus 26. The interaction between the CPU 22, the devices 24, the bus 26 and the memory 28 are well known in the art. The instant invention is directed towards the operation of these elements with respect to a set of data and programs stored in the memory 28.

It will be understood that each of the elements described above, or two or more together, also may find a useful application in other types of embodiments differing from the types described above.

While the invention has been illustrated and described as embodied in an arrangement for and a method of determining damages in shareholder class action litigation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of calculating damages over a class period in which shares were daily traded at prices affected by a securities violation in securities litigation, the method comprising the steps of:
 a) retrieving all trades and quotes from a trade and quote (TAQ) database that lists daily intraday total transaction share volume, and calculating daily total sales of the shares to all market makers, and separately distinguishably calculating daily total purchases of the shares from all the market makers for each date from a number (N) of days prior to a start date of the class period until an end date of the class period, by operation of a programmed computer, the number N of days being determined from a ratio of a public share float expressed in units of shares and an adjusted daily volume expressed in units of shares per day;
 b) calculating daily average trade propensity as a function of daily bid-ask spreads that are defined as price differentials between quoted purchase prices and quoted sales prices from daily average bid-ask spread data from the TAQ database, by operation of the programmed computer, the daily average trade propensity being the probability that the shares are traded on a daily basis on average and being inversely related to the daily bid-ask spreads;
 c) calculating a total number of the shares that were damaged by the securities violation by
  i) dividing the class period into three subperiods: (1) a first day subperiod lasting the first day of the class period, (2) an initial subperiod starting after the first day subperiod and lasting for the number N of days to a last date, and (3) a subsequent subperiod starting after the last date of the initial subperiod and ending at the end date of the class period,
  ii) utilizing the calculated daily total purchases of the shares over the first day subperiod as a number of damaged shares over the first day subperiod, by operation of the programmed computer,
  iii) adjusting the calculated daily total sales of the shares as a function of the calculated daily average trade propensity over the initial subperiod, and subtracting the adjusted daily total sales of the shares from the calculated daily total purchases of the shares over the initial subperiod, to obtain a number of damaged shares over the initial subperiod, by operation of the programmed computer, iv) subtracting the calculated daily total sales of the shares from the calculated daily total purchases of the shares over the subsequent subperiod, to obtain a number of damaged shares over the subsequent subperiod, by operation of the programmed computer, and v) summing the numbers of damaged shares over the first day subperiod, the initial subperiod and the subsequent subperiod to obtain the total number of damaged shares over the class period;

d) calculating the damages by multiplying the total number of the damaged shares by a price differential per share, by operation of the programmed computer; and e) displaying the damages calculated.

2. The method of claim 1, wherein the step a) is performed by distinguishing if a trade is executed at a bid quote or an ask quote, and categorizing all trades executed at the ask quote as buys from the market makers, and categorizing all trades executed at the bid quote as sells to the market makers.

3. The method of claim 2, wherein the step a) is further performed by comparing the share price of each trade to a preceding trade price, and categorizing all trades as buys from the market makers on an uptick where the share price is greater than the preceding trade price, or a zero-uptick where the share price is the same as the preceding trade price, and categorizing all trades as sells to the market makers on a downtick where the share price is less than the preceding trade price, or a zero-downtick where the share price is the same as the preceding trade price.

4. The method of claim 1, wherein the step a) is performed by calculating if a trade is executed at a midpoint of a bid quote and an ask quote, and categorizing all trades executed below the midpoint as sells to the market makers, and categorizing all trades executed above the midpoint as buys from the market makers.

5. The method of claim 4, wherein the step a) is further performed by comparing the share price of each trade to a preceding trade price, and categorizing all trades as buys from the market makers on an uptick where the share price is greater than the preceding trade price, or a zero-uptick where the share price is the same as the preceding trade price, and categorizing all trades as sells to the market makers on a downtick where the share price is less than the preceding trade price, or a zero-downtick where the share price is the same as the preceding trade price.

6. The method of claim 1, wherein the step b) includes calculating a number of minutes in a trading day during which the shares are traded, and calculating a daily number of the trades during the trading day.

7. The method of claim 1, and further comprising the step of calculating a standard deviation above and below a mean of the total number of the damaged shares.

8. The method of claim 1, wherein the displaying step is performed by generating a report of the damages calculated.

9. A method of calculating damages over a class period in which shares were daily traded at prices affected by a securities violation in securities litigation, the method comprising the steps of:

a) retrieving all trades and quotes from a trade and quote (TAQ) database that lists daily intraday total transaction share volume, and calculating daily total sales of the shares to all market makers, and separately distinguishably calculating daily total purchases of the shares from all the market makers for each date from a number (N) of days prior to a start date of the class period until an end date of the class period, by operation of a programmed computer, the number N of days being determined from a ratio of a public share float expressed in units of shares and an adjusted daily volume expressed in units of shares per day;

b) calculating daily average trade propensity as a function of daily bid-ask spreads that are defined as price differentials between quoted purchase prices and quoted sales prices from daily average bid-ask spread data from the TAQ database, by operation of the programmed computer, the daily average trade propensity being the probability that the shares are traded on a daily basis on average and being inversely related to the daily bid-ask spreads;

c) calculating a total number of the shares that were damaged by the securities violation by i) dividing the class period into three subperiods: (1) a first day subperiod lasting the first day of the class period, (2) an initial subperiod starting after the first day subperiod and lasting for the number N of days to a last date, and (3) a subsequent subperiod starting after the last date of the initial subperiod and ending at the end date of the class period, ii) utilizing the calculated daily total purchases of the shares over the first day subperiod as a number of damaged shares over the first day subperiod, by operation of the programmed computer, iii) adjusting the calculated daily total sales of the shares as a function of the calculated daily average trade propensity over the initial subperiod, and subtracting the adjusted daily total sales of the shares from the calculated daily total purchases of the shares over the initial subperiod, to obtain a number of damaged shares over the initial subperiod, by operation of the programmed computer, iv) subtracting the calculated daily total sales of the shares from the calculated daily total purchases of the shares over the subsequent subperiod, to obtain a number of damaged shares over the subsequent subperiod, by operation of the programmed computer, and v) summing the numbers of damaged shares over the first day subperiod, the initial subperiod and the subsequent subperiod to obtain the total number of damaged shares over the class period;

d) calculating the damages by multiplying the total number of the damaged shares by a price differential per share, by operation of the programmed computer; and e) generating a report of the damages calculated.

* * * * *